Figure 1:
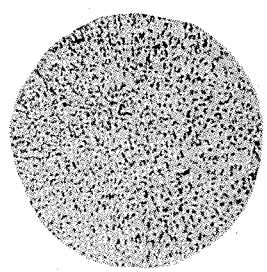

Dec. 13, 1938.  H. H. CHESNY  2,139,934

MAGNESIUM CARBONATE AND PROCESS OF MANUFACTURE

Filed Feb. 11, 1936

Inventor
Heinz H. Chesny
By
Paul D. Flehr
Attorney

Patented Dec. 13, 1938

2,139,934

UNITED STATES PATENT OFFICE 2,139,934

MAGNESIUM CARBONATE AND PROCESS OF MANUFACTURE

Heinz H. Chesny, San Mateo, Calif., assignor to Marine Chemicals Company, Ltd., South San Francisco, Calif., a corporation of Delaware Application February 11, 1936, Serial No. 63,471

3 Claims. (Cl. 23—67)

This invention relates generally to a special form of magnesium basic carbonate, and to processes for the manufacture of the same.

Magnesium basic carbonate produced by known processes is characterized by a flattened or platelike particle form, by a general lack of uniformity with respect to both particle size and shape, and by a very pronounced tendency to aggregate. For many commercial applications these characteristics involve distinct disadvantages. Compared with the product of the present invention, such prior products are relatively difficult to properly mill in with other ingredients, as for example in the manufacture of rubber goods where magnesium basic carbonate is used as a filler, or in the manufacture of printing inks. In the case of rubber goods, such a flattened particle form tends to cause stratification or an orderly lamellar arrangement of the particles, with the result that rubber goods subjected to considerable flexing tend to split longitudinally and do not possess the wear-resisting qualities and strength desired. A further disadvantage of magnesium basic carbonate having the ordinary flattened particle form is its property to more readily absorb oils and like liquids, where a lesser degree of absorption would give more favorable results. For example, when milling magnesium basic carbonate into printing inks, in the specific cases in which it is desirable to impart transparency to the mix, any undue tendency for the particles to absorb the drying oil utilized will not afford the desired transparency while simultaneously imparting to the ink the desired body. Lack of uniformity with respect to particle size is frequently detrimental of itself, in that it makes difficult precise duplication of results in successive operations, where the carbonate is being incorporated with other ingredients.

It is an object of the present invention to provide a magnesium basic carbonate and a process for the manufacture of the same, which will afford a novel physical form for the particles, and which will enable a high degree of uniformity with respect to particle size. With respect to physical form, my product is characterized by the fact that the particles are substantially spherical in shape.

Further objects of the invention will appear from the following description in which the preferred embodiment of the invention has been set forth in detail in conjunction with the accompanying drawing.

Figure 2:
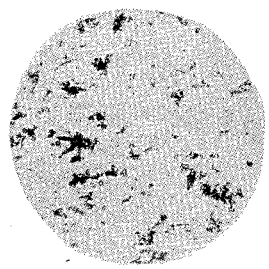
Figure 3:
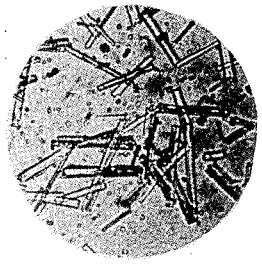

Referring to the drawing:

Figs. 1, 2 and 3 are reproductions of micro- photographs, Figs. 1 and 2 being magnified about one hundred and sixty times, while Fig. 3 is magnified three hundred times. Fig. 1 shows a product made in accordance with the present process, Fig. 2 represents magnesium basic carbonate made by carbonating magnesium hydroxide slurry at a temperature of about 32° C., followed by expansion with steam, while Fig. 3 represents magnesium normal carbonate after being carbonated at 32° C., but before expansion to form magnesium basic carbonate.

In carrying out my process, a hydrous magnesium hydroxide slurry is carbonated under such conditions that crystalline growth of magnesium normal carbonate is inhibited. The slurry utilized can be formed by various methods, although I prefer to employ a magnesium hydroxide such as is formed by the method outlined in my copending application Serial No. 709,159, filed January 31, 1934, and which is characterized by the fact that the particles of magnesium hydroxide have a relatively high degree of water of hydration. The concentration of the slurry may vary, although good results have been secured by using about 0.35 to 0.45 lb. of magnesium hydroxide per gallon of the slurry.

The carbonating step can be carried out in an open kettle to which a carbon-dioxide bearing gas, such as boiler flue gas, can be supplied. The temperature of the slurry during such treatment is not less than 50° C., the preferred range being from 52° to 58° C. The carbon-dioxide gas which is blown through the slurry during this treatment can be used to supply a part of the heat for maintaining the desired temperature. As a result of such carbonation, the magnesium hydroxide is converted to magnesium normal carbonate ($MgCO_3.3H_2O$), substantially complete conversion being indicated by neutrality to phenolphthalein.

The next step of the process is to effect so-called expansion of the slurry to form magnesium basic carbonate having approximately the composition $3MgCO_3.Mg(OH)_2.4H_2O$. Expansion is carried out by introducing live steam into the slurry, whereby its temperature is increased to nearly boiling point. This treatment causes a liberation of a part of the carbon-dioxide in changing the normal magnesium carbonate to the basic carbonate form.

The basic carbonate formed as explained above can now be dried to produce a divided or powdered product. Drying can be accomplished by a number of known methods, as for example in suitable tunnel dryers or in a spray type desiccator.

The product formed as explained above is characterized by substantially spherical-shaped particles, relatively uniform with respect to size. The particle shape is attributed to the fact that carbonation between temperature range of the order specified inhibits growth of needle-shaped crystals of magnesium normal carbonate. Carbonation at an elevated temperature also causes the product produced to be virtually free of aggregates. If the step of carbonating the slurry were carried out at normal temperatures, hexagonal needle-shaped crystals of magnesium normal carbonate would be formed, with the result that after expansion the basic carbonate particles would be flattened or plate-like aggregates which would also lack uniformity as to size.

True reproductions of microphotographs, serving to demonstrate the character of my product, are shown in the drawing. The original photographs from which these reproductions were made, were magnified two hundred times for Figs. 1 and 2, and three hundred and seventy times for Fig 3. Fig. 4 represents a product made in accordance with the present process. Note the uniformity of particle size and freedom from aggregates. Fig. 2 represents magnesium basic carbonate by carbonating the magnesium hydroxide slurry at a temperature of 32° C., followed by expansion with steam. Note the diversity of particle size, the generally elongated forms, and the presence of aggregates. Fig. 3 represents magnesium normal carbonate after being carbonated at 32° C., but before expansion to form magnesium basic carbonate. Note the formation of hexagonal and needle-like crystals of appreciable dimensions, which are responsible for the character of the product shown in Fig. 2.

It will be apparent to those skilled in the art that my product can be advantageously used as a filler in the manufacture of rubber goods, as compared to other fillers having plate-like aggregates. This is because there is no tendency for the spherical particles to line up or form an orderly lamellar arrangement when milled into the rubber mass, but on the contrary a more homogeneous mix is secured, with a more effective bonding together of the interspersed rubber. In the manufacture of printing inks, my product can be readily milled in with drying oil and other ingredients, to afford proper adsorption of the oil and a desired degree of transparency.

My product can also be characterized as having a relatively low alkalinity. This characteristic is also advantageous where my product is properly applied in the compounding of printing inks, as it tends to prevent so-called "livering", that is, coagulation caused by the formation of soaps through the interaction of the fatty acids present in the drying oils with the alkalinity of the magnesium carbonate.

The spherical particle form also causes my product in dry condition to assume a relatively high apparent density for a given particle size. For example, with a product made according to the procedure outlined, a mass of 1 cubic foot has a weight of about 10 lbs. and a particle size of about 2 to 4 microns.

With respect to uniformity of particle size, this characteristic tends to facilitate milling in with other ingredients such as drying oils, and makes for uniformity and high quality of products manufactured by the use of my basic carbonate as an ingredient. Likewise, such milling operations are facilitated by the absence of aggregates, since it is unnecessary to break down aggregates during milling. For example, in milling my magnesium carbonate into soft rubber stock, the spherical particles are readily embedded to secure a homogeneous distribution, without breakage of the particles. With magnesium carbonate having plate-like aggregates, the softness of the rubber stock acts like a cushion, to greatly minimize the shearing and compression forces exerted on the material by the milling operation, and milling is generally continued to the point of causing breakage of the aggregates.

I claim:

1. In a process for the manufacture of magnesium basic carbonate, the step of carbonating a hydrous slurry of magnesium hydroxide, while the slurry is within temperature limits of from 52 to 58° centigrade, and under a pressure not substantially greater than atmospheric, whereby a magnesium normal carbonate is formed and whereby formation of needle-like crystals is inhibited, the carbonation being continued to the extent of effecting substantially complete conversion as indicated by neutrality to phenolphthalein and then converting the magnesium normal carbonate to magnesium basic carbonate.

2. In a process for the manufacture of magnesium basic carbonate, the steps of carbonating a hydrous slurry of magnesium hydroxide, while the slurry is within temperature limits of about from 52 to 58° centigrade, and while the pressure to which the slurry is subjected is not substantially greater than atmospheric, whereby magnesium normal carbonate is formed as a result of carbonation, and whereby formation of needle-like crystals is inhibited, the carbonation being continued to the extent of effecting substantially complete conversion as indicated by neutrality to phenolphthalein and then expanding the magnesium normal carbonate to form magnesium basic carbonate, the expansion being effected by heating the slurry to a temperature substantially in excess of 58° centigrade.

3. In a process for the manufacture of magnesium basic carbonate, the steps of passing carbon dioxide through a hydrous slurry of magnesium hydroxide, while the slurry is being subjected to a pressure not substantially greater than atmospheric and within temperature limits of about 52 to 58° centigrade, whereby magnesium normal carbonate is formed and whereby formation of needle-like crystals is inhibited, the carbonation being continued to the extent of effecting substantially complete conversion as indicated by neutrality to phenolphthalein and then introducing steam into the slurry whereby the temperature of the slurry is raised to near boiling point to effect expansion of the same to magnesium basic carbonate.

HEINZ H. CHESNY.